US008748334B2

(12) United States Patent
Konishi

(10) Patent No.: US 8,748,334 B2
(45) Date of Patent: Jun. 10, 2014

(54) PROCESS FOR PRODUCING ELECTRODE CATALYST FOR FUEL CELL

(75) Inventor: Shigeru Konishi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 184 days.

(21) Appl. No.: 12/532,176

(22) PCT Filed: Feb. 28, 2008

(86) PCT No.: PCT/JP2008/053467
§ 371 (c)(1),
(2), (4) Date: Sep. 21, 2009

(87) PCT Pub. No.: WO2008/120515
PCT Pub. Date: Oct. 9, 2008

(65) Prior Publication Data
US 2010/0048388 A1    Feb. 25, 2010

(30) Foreign Application Priority Data

Mar. 29, 2007 (JP) ................................. 2007-086951

(51) Int. Cl.
H01M 4/88 (2006.01)
H01M 4/36 (2006.01)
H01M 4/38 (2006.01)
H01M 8/10 (2006.01)
H01M 4/92 (2006.01)

(52) U.S. Cl.
USPC ............ 502/101; 429/484; 429/485; 429/487

(58) Field of Classification Search
None
See application file for complete search history.

(56) References Cited

U.S. PATENT DOCUMENTS

| 3,097,974 | A | * | 7/1963 | McEvoy et al. ............... 429/525 |
| 4,446,210 | A | * | 5/1984 | Okada et al. .................... 429/42 |
| 6,866,960 | B2 | | 3/2005 | Tsumura et al. |
| 6,911,278 | B2 | | 6/2005 | Hiroshima et al. |
| 7,205,255 | B2 | | 4/2007 | Yamamoto |
| 7,223,493 | B2 | | 5/2007 | Terada et al. |
| 2002/0015878 | A1 | * | 2/2002 | Tsumura et al. ............... 429/42 |
| 2005/0142428 | A1 | | 6/2005 | Daimond et al. |
| 2007/0178363 | A1 | | 8/2007 | Fujiwara et al. |

FOREIGN PATENT DOCUMENTS

| EP | 1 156 543 A2 | 11/2001 |
| EP | 1 156 543 A3 | 11/2001 |
| EP | 1 947 719 A1 | 7/2008 |
| JP | 2001 118582 | 4/2001 |
| JP | 2002 100374 | 4/2002 |
| JP | 2002 231257 | 8/2002 |
| JP | 2003 92114 | 3/2003 |
| JP | 2005 135900 | 5/2005 |
| JP | 2005 235688 | 9/2005 |
| JP | 2005 246380 | 9/2005 |
| JP | 2005 251455 | 9/2005 |
| JP | 2006 205088 | 8/2006 |
| JP | 2007 134295 | 5/2007 |
| WO | 2005 088748 | 9/2005 |

OTHER PUBLICATIONS

Takasu, T. et al., "Effect of Structure of Carbon-Supported PtRu Electrocatalysts on the Electrochemical Oxidation of Methanol", Journal of the Electrochemical Society, vol. 147, No. 12, pp. 4421-4427, (2000).
Schmidt, T.J., "PtRu Alloy Colloids as Precursors for Fuel Cell Catalysts", Journal of Electrochemical Society, vol. 145, No. 3, pp. 925-931, (1998).
Extended European Search Report issued Apr. 3, 2012, in Patent Application No. 08720962.3.

* cited by examiner

Primary Examiner — Bijay Saha
(74) Attorney, Agent, or Firm — Oblon, Spivak, McClelland, Maier & Neustadt, L.L.P.

(57) ABSTRACT

This invention provides a process for producing an electrode catalyst for a fuel cell, comprising a first support step of producing metallic fine particles having an average particle diameter of 0.1 to 1.5 nm provided at regulated particle intervals on an electroconductive carbon carrier, and a second support step of growing a metal identical to or dissimilar to the metal using the metallic fine particles as a nucleus. In the first support step, the metallic fine particles are supported by an immersion method. The above constitution can provide an electrode catalyst for a fuel cell, which has a high level of percentage support, has a high level of dispersibility, and has improved methanol oxidation activity per weight of the catalyst. Further, when treatment in an atmosphere containing hydrogen is carried out at a low temperature below 100° C., the methanol oxidation activity per active surface area can be improved without lowering the active area.

12 Claims, No Drawings

PROCESS FOR PRODUCING ELECTRODE CATALYST FOR FUEL CELL

TECHNICAL FIELD

This invention relates to a process for producing an electrode catalyst suited for fuel cells and especially for direct methanol fuel cells.

BACKGROUND ART

For mobile phones, batteries with a higher capacity are desired, but it is quite difficult to increase the capacity of secondary batteries. Thus direct methanol fuel cells (DMFC) using methanol fuel become of greater interest.

DMFC has the advantage of possible size reduction since they can utilize liquid fuel directly without converting it into hydrogen or the like. Research efforts have been made thereon toward commercial use. However, the problems that the electrolyte membrane has a high methanol permeability and the anode catalyst has a low methanol oxidation activity arrest the commercial application of DMFC.

Most often PtRu catalysts are used as the anode catalyst. While efforts are made to search for high activity catalysts other than PtRu, no other catalysts have overtaken PtRu. Means for enhancing the activity of PtRu catalysts include use of a supported catalyst in which PtRu nano-particles having a small particle size and a large surface area are dispersed on a carbon support. Notably, commercially available supported catalysts, for example, TEC61E54 (54 wt % PtRu/C, Tanaka Kikinzoku Group, PtRu size 4 nm) still have an insufficient activity, with a further enhancement of activity being needed. To this end, it is desired that PtRu particles be further reduced in particle size (less than 4 nm) and more richly and uniformly supported on a carbon support (high loading and high dispersion).

Catalysts are prepared, for example, by an immersion technique. This technique involves admitting support carbon into an aqueous solution of a platinum or other metal precursor, impregnating the carbon with the metal precursor, separating the impregnated carbon, and chemically reducing with hydrogen or the like, whereby the reduced metal is loaded on the support carbon. Y. Takasu et al., Journal of Electrochemical Society, 147 (12), 4421-4427, 2000 (Non-Patent Document 1) describes high-dispersion PtRu-laden carbon prepared by the immersion technique, which has a metal loading of 30 wt %. A reducing temperature of 200 to 450° C. is necessary, and PtRu particles have an average particle size of 3 to 4 nm. An attempt to further increase the metal loading by the immersion technique results in PtRu particles having a larger average particle size and hence a smaller active surface area. That is, the immersion technique is difficult to achieve a high loading of fine size PtRu particles in a good dispersion.

Another catalyst preparation method is a colloidal method. In this method, PtRu colloids are prepared in solution and then loaded on support carbon. This method has advantageous abilities to control the size of PtRu particles and reduce the particle size distribution. Preparation of PtRu-laden catalyst by the Bonnemann method is described in T. J. Schmidt et al., Journal of Electrochemical Society, 145 (3), 925-931, 1998 (Non-Patent Document 2). Using $PtCl_2$ and $RuCl_3$ as reactants in THF solvent, a monohydride as a reducing agent, and tetraoctyl ammonium as a protective agent in a dry Ar atmosphere, colloids of 1.7±0.5 nm are prepared. In this document, however, the loading on support carbon is as low as 20 wt %. Further, since heat treatment at high temperature is necessary to remove the protective agent, the heat treatment causes agglomeration of PtRu particles to reduce the specific surface area of PtRu, which is problematic even if a high loading of PtRu is possible. Namely, even if PtRu colloids having a small average particle size are prepared, it is difficult to accomplish higher loading and higher dispersion while maintaining the particle size.

Non-Patent Document 1: Y. Takasu et al., Journal of Electrochemical Society, 147 (12), 4421-4427, 2000

Non-Patent Document 2: T. J. Schmidt et al., Journal of Electrochemical Society, 145 (3), 925-931, 1998

DISCLOSURE OF THE INVENTION

Problem to be Solved by the Invention

An object of the invention which has been made under the above-discussed circumstances is to provide a process for producing an electrode catalyst having a high loading and a large active surface area, suited for fuel cells and especially for direct methanol fuel cells (DMFC).

Means for Solving the Problem

Making extensive investigations to attain the above object, the inventors have found that when a process of forming metal nuclei such as Pt on support carbon, then growing PtRu on the metal nuclei (to be referred to as two-stage loading process, hereinafter) is used as means for producing a highly loaded/highly dispersed PtRu-laden catalyst, there is obtainable a catalyst in which PtRu particles having an average particle size of up to 4 nm are loaded on carbon in a well dispersed fashion even at a loading of at least 50 wt %. Although a catalyst having a methanol oxidation activity 2.5 times higher than commercially available TEC61E54 can be prepared by this two-stage loading process, a further improvement in catalyst activity is desired for higher power capacity so that the catalyst may be actually used in fuel cells.

Continuing further investigations, the inventors have found that while formation of metal nuclei on support carbon is conventionally performed by alcohol reduction in a solution containing carbon and metal salt, formation of metal nuclei by an immersion technique is successful in providing the catalyst with a greater specific surface area even at the same loading. Particularly when Ru is used as the metal species, a significantly large specific surface area is available, and a highly loaded/highly dispersed PtRu/C catalyst resulting from PtRu growth thereon has a large specific surface area and an improved methanol oxidation activity per PtRu weight (weight activity). It has also been found that when the catalyst is further treated in a hydrogen-containing atmosphere at a temperature below 100° C., it is improved in methanol oxidation activity per active surface area (specific surface area activity) while maintaining a large active surface area, and also improved in the weight activity of PtRu. The present invention is predicated on these findings.

Accordingly, the invention provides a process for producing an electrode catalyst for fuel cells, as defined below.

[1] A process for producing an electrode catalyst for fuel cells, comprising a first loading step of providing metal nano-particles on an electroconductive carbon support, the metal nano-particles having an average particle size of 0.1 to 1.5 nm and being distributed at a controlled spacing therebetween, and a second loading step of growing the same metal or another metal on the metal nano-particles as nuclei, wherein in the first loading step, the metal nano-particles are loaded by an immersion technique.

[2] A process for producing an electrode catalyst for fuel cells according to [1] wherein the metal nano-particles to be loaded on an electroconductive carbon carrier are Pt nano-particles, and the other metal to be grown on the Pt nano-particles as nuclei is PtRu.

[3] A process for producing an electrode catalyst for fuel cells according to [1] wherein the metal nano-particles to be loaded on an electroconductive carbon carrier are Ru nano-particles, and the other metal to be grown on the Ru nano-particles as nuclei is PtRu.

[4] A process for producing an electrode catalyst for fuel cells according to [1] wherein the metal nano-particles to be loaded on an electroconductive carbon carrier are Pt nano-particles, and the metal to be grown on the Pt nano-particles as nuclei is Pt.

[5] A process for producing an electrode catalyst for fuel cells according to any one of [1] to [4] wherein after the first loading step, a loading of metal particles is up to 30 wt %.

[6] A process for producing an electrode catalyst for fuel cells according to any one of [1] to [5] wherein after the second support step, an overall loading of metal particles is at least 50 wt %.

[7] A process for producing an electrode catalyst for fuel cells according to any one of [1] to [6], further comprising, after the second loading step, treating in a hydrogen-containing atmosphere at a temperature below 100° C.

Advantageous Effects of the Invention

The process of the invention is successful in producing a fuel cell electrode catalyst having a high loading, a high dispersion, and an improved methanol oxidation activity per catalyst weight. A further treatment in a hydrogen-containing atmosphere at a temperature below 100° C. is effective in improving the methanol oxidation activity per active surface area without detracting from the active area.

BEST MODE FOR CARRYING OUT THE INVENTION

The process for producing an electrode catalyst for fuel cells according to the invention comprises
(i) a first loading step of providing metal nano-particles on an electroconductive carbon support by an immersion technique, the metal nano-particles having a particle size of 0.1 to 1.5 nm and being distributed at a controlled spacing therebetween, and
(ii) a second loading step of growing the same metal or another metal on the metal nano-particles as nuclei.

In the first loading step, loading by an immersion technique means that metal nano-particles are loaded on a conductive carbon support by mixing a solution containing a compound of a metal to be loaded (precursor metal compound) with a conductive carbon support, allowing the conductive carbon support to be impregnated with the solution (allowing the solution to infiltrate into pores in the porous carbon support), distilling off the solvent from the solution-impregnated conductive carbon support in the solution, followed by drying, or separating the solution-impregnated conductive carbon support from the solution by such means as filtration, followed by drying, and heating the support in a reducing atmosphere. As used herein, the term "loading" or "loaded" is interchangeable with "supporting" or "supported."

Examples of the conductive carbon support which can be used in the first loading step include acetylene black, furnace black, channel black, activated carbon, graphite, carbon nanotubes, carbon nanofibers, and carbon nanocoils. The conductive carbon support preferably have an average primary particle size of 10 to 200 nm, and more preferably 10 to 50 nm. With an average particle size of less than 10 nm, it may be difficult in some cases to uniformly disperse the carbon and have metal nano-particles with an average particle size of up to 1.5 nm loaded thereon. An average primary particle size of more than 200 nm may correspond to a reduced amount of metal per unit volume, raising the risk that a catalyst layer must be thicker to incorporate a predetermined amount of catalyst in a fuel cell during its fabrication, and such a thick catalyst layer may interfere with effective fuel supply. It is noted herein that the average particle size may be determined by taking a photographic image (for example, an image of X2,000,000 magnification) under a transmission electron microscope (TEM), measuring particle diameters and computing an average thereof, for example, measuring diameters of about 300 particles and computing an average thereof.

Examples of the metal to be loaded on the carbon support include Pt, Au, Ag, Ir, Os, Pd, Rh, Ru, Cu, Ni, Co, Fe, Mn, Cr, V, Ti, Mo, W, Ta, Bi, Sn, etc. Inter alia, Pt or Ru, especially Ru is preferred because a higher active surface area is available from a loading of the same weight. The metal is provided and loaded as nano-particles having an average particle size of 0.1 to 1.5 nm on the carbon support at a controlled spacing between particles.

As used herein, the term "a controlled spacing between nano-particles" means that nano-particles are uniformly dispersed on carbon surfaces without agglomeration. The means for controlling the spacing between nano-particles may be by impregnating carbon with a metal source at a loading of up to 30 wt %, specifically less than 30 wt %, preferably up to 15 wt %, followed by chemical reduction in a gas phase. In particular, an impregnation-gas phase reduction procedure of impregnating carbon with metal source and reducing in a gas phase is preferable because the active surface area of metal nano-particles can be increased.

Also, nucleation by metal nano-particles in the first loading step is limited to a particle size of up to 1.5 nm as described above. With a particle size of more than 1.5 nm, final catalyst particles resulting therefrom have a large particle size and tend to agglomerate, failing to provide a highly dispersed catalyst. Formation to a particle size of up to 1.5 nm ensures firm bond to the support and uniform dispersion on carbon. Most preferably the metal nano-particles in the first loading step have a particle size of up to 1.0 nm.

The means for forming and loading metal nano-particles in the first loading step is, for example, by first adding a solution containing a compound of a metal to be loaded (precursor metal compound) to a dispersion of carbon support in a solvent, followed by mixing. When it is desired to form and load Pt nano-particles, for example, a platinum compound is added to a dispersion of the carbon support in a solvent in a concentration of 0.01 to 2 wt %, more specifically 0.1 to 1 wt %, followed by mixing, with exemplary platinum compounds including chloroplatinic acid, platinum(II) chloride, platinum(IV) chloride, diamminedinitroplatinum(II), bisacetylacetonatoplatinum, dichlorotetramineplatinum, platinum tetraminesulfate, ammonium platinum(II) chloride, ammonium platinum(IV) chloride, and diamminedichloroplatinum. When Ru nano-particles are formed, a ruthenium compound is added to the above-described carbon dispersion, followed by mixing, with exemplary ruthenium compounds including ruthenium chloride, ruthenium nitrosyl nitrate, ruthenium nitrate, potassium ruthenium chloride, sodium ruthenium chloride, tris(acetylacetonato)ruthenium, triruthenium dodecacarbonyl, and potassium ruthenium nitroso chloride. Note that the dispersion generally contains the metal compound in a concentration of 0.001 to 5 wt %, and more preferably 0.01 to 1 wt %.

In these embodiments, the amount of metal compound is preferably at least 0.1 wt %, more preferably at least 1 wt %, even more preferably at least 5 wt %, and up to 30 wt %, more preferably less than 30 wt %, even more preferably up to 15 wt % of the metal in the metal compound, based on the total of the conductive carbon support and the metal in the metal compound. If the amount of metal compound is too small, less nuclei may grow on the carbon surface. If the amount of metal compound is too large, coarse particles may develop, failing to produce a highly dispersed catalyst having a high loading. The solvent used in dispersion may be water, water and a water-soluble organic solvent, or an organic solvent, and a choice may be made among those solvents in which the metal compound used is dissolvable. Mixing may be performed at room temperature (e.g., 10 to 30° C.) for 1 to 24 hours, preferably 2 to 16 hours. A time of less than 1 hour may fail to achieve thorough mixing whereas more than 24 hours of mixing may incur no difference.

From the liquid mixture thus obtained, the solvent is removed, for example, on a rotary evaporator at a temperature near room temperature (e.g., 20 to 50° C.), followed by drying. Drying is preferably effected at 40 to 150° C., more preferably 60 to 120° C. for 3 to 48 hours, more preferably 8 to 24 hours. The dried sample is then transferred to a tray, for example, and placed in a reducing furnace, where it is chemically reduced into metal particles. As the atmosphere within the furnace, a reducing gas such as hydrogen or carbon monoxide may be used in neat form or in diluted form with an inert gas such as nitrogen, He or Ar. The temperature is preferably 200 to 900° C., especially 200 to 500° C. Temperatures below 200° C. may fail to facilitate complete reduction whereas temperatures above 900° C. may cause metal particles to become coarse. The treatment time is preferably 1 minute to 6 hours, especially 1 to 3 hours. A time of less than 1 minute may fail to achieve full reduction whereas more than 6 hours may bring no substantial change.

At the end of reduction, a loading of metal nano-particles is preferably at least 0.1 wt %, more preferably at least 1 wt %, even more preferably at least 5 wt %, and up to 30 wt %, more preferably less than 30 wt %, even more preferably up to 15 wt %. With too low a loading, an insufficient number of nuclei grow on the carbon surface. With too high a loading, metal nano-particles may become larger in size, failing to produce a highly dispersed catalyst having a high loading. Note that the loading (loading of metal nuclei) is determined by the following equation (1).

$$\text{Loading (wt \%)} = [A/(A+C)] \times 100 \tag{1}$$

A: weight of metal nano-particles
C: weight of carbon support

After metal nano-particles are loaded on the carbon support as described above, the same metal or another metal (catalytic metal) is grown on the metal nano-particles serving as nuclei. Suitable catalytic metals for the anode catalyst (methanol oxidizing catalyst) include PtRu (platinum-ruthenium), PtSn, PtMo, PtW, PtRh, PtPd, PtAu, PtRuSn, PtRuRh, PtRuPd, PtRuIr, PtRuAu, PtRuMo, and PtRuW, with PtRu being preferred for high methanol oxidation activity.

The fuel cell electrode catalyst of the invention is advantageously used as the anode catalyst (methanol oxidizing catalyst). The anode catalyst (methanol oxidizing catalyst) assists in deriving a current flow by methanol oxidation reaction. Most often PtRu has heretofore been used, and the reaction takes place on surfaces of PtRu particles. Therefore, the smaller the PtRu particle size, the larger becomes the surface area per PtRu weight, and the higher becomes the activity per PtRu weight. In the case of a catalyst supported on carbon, since the carbon has a substantial volume, the thickness of a catalyst layer being formed depends on the amount of carbon used. To facilitate diffusion of fuel and reaction product, a catalyst layer of reduced thickness is preferred. It is then desired that the catalytic metal such as PtRu be supported on carbon particles in a possible maximum amount (a high loading). If catalytic metal particles such as PtRu particles are supported in agglomerated form at this point, the interior of agglomerates is not accessible to the reaction. It is then desired that catalytic metal particles such as PtRu particles be supported in a highly dispersed manner without agglomeration.

According to the invention, a highly dispersed catalyst having a high loading can be produced by forming metal particles (e.g., Pt or Ru) having an average particle size of 0.1 to 1.5 nm on carbon by an immersion technique, then loading or growing a catalytic metal such as PtRu on nuclei of Pt, Ru or the like.

As described above, the process involving the first stage (first loading step) of forming metal nano-particles or nuclei of Pt, Ru or the like, and the second stage (second loading step) of loading or growing a catalytic metal such as PtRu on the nuclei is able to produce a highly dispersed catalyst having a high loading. The catalytic metal such as PtRu finally formed has an average particle size of up to 4 nm, preferably up to 3 nm, and more preferably up to 2 nm. The lower limit of particle size is not critical although it is usually at least 0.1 nm, and specifically at least 1.0 nm. A particle size in excess of 4 nm is equal to or greater than the size of commercially available catalyst TEC61E54 and sometimes fails to achieve the activity improving effect.

At the end of the second loading step, an overall loading of metal particles is preferably at least 50 wt %, more preferably at least 60 wt %. With a loading of less than 50 wt %, nano-scale catalytic metal particles such as PtRu are readily dispersed, but a catalyst layer formed during fabrication of a membrane-electrode assembly (MEA) becomes thicker than that from a higher loading catalyst. Then the supply of methanol fuel becomes a velocity controlling factor, and the power may be reduced as compared with the use of a higher loading catalyst. The upper limit of loading is not critical although it is usually up to 90 wt %, preferably up to 70 wt %. Note that the loading (loading of metal nuclei and catalytic metal) is determined by the following equation (2).

$$\text{Loading (wt \%)} = [(A+B)/(A+B+C)] \times 100 \tag{2}$$

A: weight of metal nuclei (weight of metal nuclei resulting from first loading step)
B: weight of catalytic metal (e.g., PtRu) (weight of catalytic metal resulting from second loading step)
C: weight of carbon support The means of growing the catalytic metal on the metal nano-particle nuclei in the second loading step employs a process of mixing the carbon support having the metal nano-particle nuclei loaded thereon into a solution of a compound of a metal to be grown in an alcohol-containing solvent, for example, when PtRu is to be grown, a solution of a platinum compound and a ruthenium compound in an alcohol-containing solvent, and effecting reaction at 50 to 120° C., specifically 60 to 100° C., more specifically the reflux temperature of the solvent, for 1 to 10 hours, specifically 3 to 8 hours, thereby creating and growing PtRu nano-particles on the metal nano-particle nuclei. Herein, exemplary platinum compounds include chloroplatinic acid, platinum(II) chloride, platinum(IV) chloride, diamminedinitroplatinum(II), bisacetylacetonatoplatinum, dichlorotetramineplatinum, platinum tetraminesulfate, ammonium platinum(II) chloride, ammonium platinum(IV) chloride, and diamminedichloroplatinum, exemplary ruthenium compounds include ruthenium chloride, ruthenium nitrosyl nitrate, ruthenium nitrate, potassium ruthenium chloride, sodium ruthenium chloride, tris(acetylacetonato)ruthenium, triruthenium dodecacarbonyl, and potassium ruthenium nitroso chloride, and exemplary alcohols include ethanol, methanol, n-propanol, i-propanol, butanol, and ethylene glycol. That is, while the carbon support having the metal nano-particle nuclei loaded thereon is kept in a solution containing a salt of a catalytic metal to be created, the metal ion is reduced by the alcohol to create and grow the catalytic metal on the metal nano-particle nuclei.

In this embodiment, the platinum compound and ruthenium compound are preferably used in such amounts that a molar ratio of platinum metal to ruthenium metal may range between 2:8 and 9:1, specifically between 5:5 and 8:2. If the amount of platinum compound is too small, C—H dissociation reaction of methanol may be retarded, resulting in a methanol oxidation current value being reduced. If the amount of platinum compound is too large, oxidation reaction of CO, an intermediate reaction product of methanol is unlikely to occur, leading to a lower methanol oxidation activity at a low potential (equal to or less than 0.4 V vs RHE). If the amount of ruthenium compound is too small, there results a lower methanol oxidation activity at a low potential as in the case of excess platinum. If the amount of ruthenium compound is too large, there results a lower methanol oxidation current value as in the case of short platinum.

The carbon support for supporting the metal nano-particle nuclei thereon is preferably dispersed in the solution in a concentration of 0.01 to 2 wt %, specifically 0.1 to 1 wt %. If the amount of the carbon support is too small, the amount of the resulting catalyst is reduced. If the amount of the carbon support is too large, it becomes difficult to disperse the carbon, which gives rise to such problems as agglomeration of metal particles and formation of coarse particles.

It is noted that although the average particle size of the catalytic metal such as PtRu may be reduced to or below 4 nm by preparing colloids with a size up to 4 nm and causing them be loaded on carbon, an attempt to provide a loading of at least 50 wt % entails a tendency for colloid particles to agglomerate and a difficulty of uniform dispersion. When metal nuclei are provided on carbon at a low loading, the metal nuclei are uniformly dispersed on carbon surfaces, which ensures that subsequent growth of PtRu or the like on these metal nuclei results in metal particles having a particle size of up to 4 nm and being uniformly dispersed even at a loading of at least 50 wt %. Particularly when metal nucleation is effected by the immersion technique, nuclei having a higher active area, i.e., smaller particle size can be formed on the carbon support in a highly dispersed manner. Absent metal nuclei, an attempt to provide a loading of at least 50 wt % entails agglomeration. Also, while a loading within the above-defined range may be provided by adjusting the amount of metal source admitted into the solution, the concentration of the metal compound in the solution is preferably 0.001 to 5 wt %, and specifically 0.01 to 1 wt %.

The carbon support catalyst on which the catalytic metal is grown as mentioned above may be further enhanced in methanol oxidation activity by treating it in a hydrogen-containing atmosphere. The preferred treating conditions used herein include an atmosphere containing hydrogen and an inert gas such as nitrogen, He or Ar in a ratio between 100:0 and 1:99 (volume ratio), a temperature up to 300° C., and a time of 1 minute to 5 hours, specifically 30 minutes to 2 hours. A time of less than 1 minute achieves an insufficient hydrogen treatment effect. If the time is more than 5 hours, no change in the effect is discernable.

Such treatment in a hydrogen-containing atmosphere improves the methanol oxidation activity per surface area of the catalytic metal such as PtRu. It is noted that in the case of PtRu/C with a loading of at least 50 wt %, an elevation in the treating temperature entails agglomeration and growth of PtRu particles. This results in a reduction of PtRu specific surface area. Although the activity per specific surface area of PtRu is improved, the activity per weight of PtRu is reduced due to such a reduction of specific surface area. Thus, when the treating temperature is set below 100° C., the specific surface area is unchanged from before the treatment, the activity per surface area is improved, and the activity per weight of PtRu is improved.

In embodiments wherein such treating conditions are employed, the preferred treatment is in the above-described atmosphere at a temperature below 100° C., specifically of 20 to 80° C., more specifically 30 to 60° C. for 0.5 to 8 hours, specifically 1 to 3 hours.

The fuel cell electrode catalyst thus obtained is suited for use as the electrode catalyst in direct methanol fuel cells.

The process for producing a fuel cell electrode catalyst according to the invention is also effective as the process for producing a cathode electrocatalyst. In this embodiment, examples of the metal of the metal nano-particles used in the first loading step include Pt, Au, Ag, Ir, Os, Pd, Rh, Ru, Cu, Ni, Co, Fe, Mn, Cr, V, Ti, Mo, W, Ta, Bi, Sn, etc., with Pt being most preferred. Examples of the catalytic metal used in the second loading step include Pt, Au, Ag, Ir, Os, Pd, Rh, Ru, Cu, Ni, Co, Fe, Mn, Cr, V, Ti, Mo, W, Ta, Bi, Sn, PtAu, PtPd, PtRh, PtCu, PtNi, PtCo, PtFe, PtCr, etc., with Pt being most preferred. In this way, a highly dispersed cathode electrocatalyst with a high loading is obtainable. It is noted that the first and second loading steps may be carried out as in the above-described embodiment of anode electrocatalyst.

EXAMPLE

Examples and Comparative Examples are given below for illustrating the invention, but the invention is not limited thereto.

Example 1

In a solvent of 700 mL water and 100 mL ethanol, 1 g of Ketjen Black EC300J (Lion Co., Ltd.) as carbon support was dispersed. A diamminedinitroplatinum(II) solution containing 0.1765 g of platinum was added thereto, followed by mixing at room temperature for 5 hours. Then using a rotary evaporator, water and ethanol were removed. The residue was dried at 80° C. for 24 hours, yielding a diamminedinitroplatinum-impregnated carbon support.

The support was placed in a tubular furnace and treated in an atmosphere of 1 L/min of nitrogen and 0.5 L/min of hydrogen at 350° C. for 3 hours, obtaining a catalyst having 15 wt % of Pt nuclei loaded thereon. A TEM image of the treated catalyst was taken to ascertain that nano-particles having an average particle size of 1.0 nm were uniformly dispersed on the support.

Evaluation of active surface area was by the CO stripping method. A test electrode was manufactured by ultrasonically dispersing the catalyst in water, adding dropwise the dispersion onto a glassy carbon electrode, drying, and adding dropwise 5% Nafion solution (by DuPont) thereto. The electrode was attached to a potentiostat HZ5000 (Hokuto Denko Co., Ltd.) and immersed in an electrolytic cell containing 0.5 mol/L of $H_2SO_4$. The atmosphere of the electrolytic cell was purged with Ar, after which with the catalyst held at 0.02 V (vs RHE), CO gas was bubbled for 20 minutes for CO adsorption. With the catalyst held at the same potential, Ar gas was bubbled for 20 minutes for expelling excess CO gas. Thereafter, a CO stripping voltammogram was measured by potential sweeping over a potential range of 0.02 to 1.1 V (vs RHE) at a sweep rate of 10 mV/s, and potential sweeping was performed again after desorption of CO. Provided that an area difference is a CO oxidation current flow and the CO oxidation has a Coulomb charge of $4.2 C/m^2$, an active surface area of Pt nuclei was computed. Pt nuclei at a loading of 15 wt % had an active surface area of 130 $m^2$/g-Pt.

The carbon having Pt nuclei loaded thereon, 0.5 g, was admitted into 600 g of a solution containing 1.1 g of diamminedinitroplatinum(II), 0.5 g of ruthenium chloride, and 100 g of ethanol, which was heated under reflux at 80° C. for 8 hours. There was obtained 1.4 g of a catalyst having a loading (loading of metal nuclei and catalytic metal) of 68 wt %. A TEM observation showed an average particle size of 2.1 nm and uniform dispersion on carbon.

Methanol oxidation activity was evaluated by potential sweeping in an electrolytic solution containing 0.5 mol/L of $H_2SO_4$ and 1 mol/L of $CH_3OH$, over a potential range of 0.02 to 0.9 V (vs RHE) at a sweep rate of 1 mV/s and measuring an oxidation current flow. The evaluations of active area and methanol oxidation activity were both performed at 25° C.

Example 2

In a solvent of 700 mL water and 100 mL ethanol, 1 g of Ketjen Black EC300J as carbon support was dispersed. A ruthenium(III) nitrate solution containing 0.1765 g of ruthenium was added thereto, followed by mixing at room temperature for 5 hours. Then using a rotary evaporator, water and ethanol were removed. The residue was dried at 80° C. for 24 hours, yielding a ruthenium nitrate-impregnated carbon support.

The support was placed in a tubular furnace and treated in an atmosphere of 1 L/min of nitrogen and 0.5 L/min of hydrogen at 350° C. for 3 hours, obtaining a catalyst having 15 wt % of Ru nuclei loaded thereon. A TEM image of the treated catalyst was taken, but the presence of Ru nano-particles was not ascertained. The presence of Ru was examined by the CO stripping method to find the presence of adsorbed CO, from which the presence of Ru nano-particles was surmised. The active surface area was computed to be 170 $m^2$/g-Ru, indicating a noticeably high specific surface area as compared with the Pt nuclei.

The carbon having Ru nuclei loaded thereon, 0.5 g, was admitted into 600 g of a solution containing 1.1 g of diamminedinitroplatinum(II), 0.5 g of ruthenium chloride, and 100 g of ethanol, which was heated under reflux at 80° C. for 8 hours. There was obtained 1.4 g of a catalyst having a loading (loading of metal nuclei and catalytic metal) of 68 wt %. A TEM observation showed an average particle size of 1.8 nm and uniform dispersion on carbon.

Example 3

The 68 wt % PtRu/C catalyst prepared in Example 2 was treated in an atmosphere of 1 L/min of nitrogen and 0.5 L/min of hydrogen at 60° C. for 1 hour. On observation of a TEM image of the treated catalyst, PtRu had an average particle size of 1.8 nm, and its properties including dispersion on carbon showed no material changes from before the treatment.

Comparative Example 1

Pt nuclei were formed on a carbon support by alcohol reduction in a liquid phase in the presence of a Pt source and carbon support. To 500 mL of a dispersion of 5 g of Ketjen Black EC300J in water, a diamminedinitroplatinum(II) solution containing 0.88 g of platinum was added, and 500 g of ethylene glycol was further added. This mixture was heated and stirred at 60° C. for 12 hours. It was filtered, washed, and dried at 80° C. for 24 hours, obtaining 5.88 g of carbon having Pt nuclei loaded thereon. The carbon having Pt nuclei loaded thereon was observed under TEM to find an average particle size of 1.2 nm, which was larger than the Pt nuclei prepared by the immersion technique in Example 1. The active surface area was 100 $m^2$/g-Pt as computed by the CO stripping method, indicating a smaller active area than that by the immersion technique.

The carbon having Pt nuclei loaded thereon, 0.5 g, was admitted into 600 g of a solution containing 1.1 g of diamminedinitroplatinum(II), 0.5 g of ruthenium chloride, and 100 g of ethanol, which was heated under reflux at 80° C. for 8 hours. There was obtained 1.4 g of a catalyst having a loading (loading of metal nuclei and catalytic metal) of 68 wt %. A TEM observation showed an average particle size of 2.4 nm.

Comparative Example 2

A 68 wt % PtRu/C catalyst was prepared in one stage (or step) solely by the immersion technique. In a solvent of 700 mL water and 100 mL ethanol, 1 g of Ketjen Black EC300J was dispersed. To this dispersion were added a diamminedinitroplatinum(II) solution containing 1.67 g of platinum and a ruthenium(III) nitrate solution containing 0.36 g of ruthenium, followed by mixing at room temperature for 5 hours. Then using a rotary evaporator, water and ethanol were removed. The residue was dried at 80° C. for 24 hours, yielding a carbon support impregnated with diamminedinitroplatinum and ruthenium nitrate.

The support was placed in a tubular furnace and treated in an atmosphere of 1 L/min of nitrogen and 0.5 L/min of hydrogen at 350° C. for 3 hours, obtaining a catalyst having a loading (loading of metal nuclei and catalytic metal) of 68 wt %. On observation of a TEM image of the treated catalyst, PtRu had an average particle size of 5.2 nm, and coarse particles in excess of 6 nm were present.

For the PtRu/C catalysts with a loading of 68 wt % in Examples 1 to 3 and Comparative Examples 1 and 2, the active surface area and the test results of 0.4 V and 0.5 V (vs RHE) methanol oxidation activity are shown in Table 1.

TABLE 1

| | Average particle size (nm) | Active surface area ($m^2$/g-PtRu) | Methanol oxidation weight activity (A/g-PtRu) | |
|---|---|---|---|---|
| | | | 0.4 V vs RHE | 0.5 V vs RHE |
| Example 1 | 2.1 | 110 | 5.31 | 60.2 |
| Example 2 | 1.8 | 130 | 6.12 | 68.8 |
| Example 3 | 1.8 | 130 | 7.08 | 76.5 |
| Comparative Example 1 | 2.4 | 92 | 4.69 | 44.5 |
| Comparative Example 2 | 5.2 | 53 | 0.51 | 16.3 |

A comparison of the PtRu/C catalyst with a high loading of 68 wt % prepared in one stage (or step) solely by the immersion technique (Comparative Example 2) with the other catalysts reveals that Comparative Example 2 has a smaller active surface area and a lower methanol oxidation activity. A comparison of Example 1 where Pt nuclei were prepared by the immersion technique with Comparative Example 1 where Pt nuclei were prepared by alcohol reduction in liquid phase reveals that the immersion technique is able to form finer Pt nuclei, leading to a smaller average particle size and a greater active surface area after PtRu growth and hence, a higher methanol oxidation activity. Examples 1 and 2 which commonly rely on the immersion technique, but use Pt and Ru nuclei, respectively, demonstrate that since the Ru nuclei have a greater active surface area, they lead to a greater active surface area after PtRu growth and a higher methanol oxidation activity. A comparison of Example 2 with Example 3 where the same is further treated with hydrogen at 60° C. reveals that while the active surface area remains unchanged due to the low treatment temperature, the hydrogen treatment enhances the methanol oxidation activity per surface area of PtRu and hence, the metal oxidation activity per weight of PtRu.

Accordingly, the formation of Pt and Ru nuclei by the immersion technique ensures that highly loaded catalysts after PtRu growth have a greater active surface area and a higher methanol oxidation activity. Even an attempt to achieve a high loading in one stage solely by the immersion technique provides a smaller active surface area, indicating that it is effective in enhancing the catalyst activity to form nuclei at a low loading by the immersion technique and to grow a catalytic metal on these nuclei. Further treatment in a hydrogen-containing atmosphere in a temperature range which does not cause particle size enlargement ensures to enhance the methanol oxidation activity of highly loaded/highly dispersed PtRu/C catalysts.

The invention claimed is:

1. A process for producing an electrode catalyst for fuel cells, comprising
   loading metal nano-particles on an electroconductive porous carbon carrier support, the metal nano-particles having an average particle size of 0.1 to 1.5 nm and being distributed at a controlled spacing therebetween, and
   growing the same metal or another metal on the loaded metal nano-particles as nuclei,
   wherein in the loading, the metal nano-particles are loaded by an immersion technique, comprising
   adding a metal compound as a source of the nano-particles to a dispersion where particles of the porous carbon carrier support are dispersed in a solvent,
   impregnating pores of the porous carbon carrier support with a solution containing the metal compound,
   removing the solvent, and
   reducing the metal source to the metal nano-particles on the porous carbon carrier support in a gas phase.

2. The process for producing an electrode catalyst for fuel cells according to claim 1 wherein the metal nano-particles to be loaded on an electroconductive carbon carrier are Pt nano-particles, and the other metal to be grown on the Pt nano-particles as nuclei is PtRu.

3. The process for producing an electrode catalyst for fuel cells according to claim 1 wherein the metal nano-particles to be loaded on an electroconductive carbon carrier are Ru nano-particles, and the other metal to be grown on the Ru nano-particles as nuclei is PtRu.

4. The process for producing an electrode catalyst for fuel cells according to claim 1 wherein the metal nano-particles to be loaded on an electroconductive carbon carrier are Pt nano-particles, and the metal to be grown on the Pt nano particles as nuclei is Pt.

5. The process for producing an electrode catalyst for fuel cells according to claim 1 wherein the electroconductive carbon carrier has a loading of metal nano-particles of up to 30 wt % of the total of the loaded metal nano-particles and the electroconductive carbon carrier prior to growing the same or another metal on the loaded metal nano-particles.

6. The process for producing an electrode catalyst for fuel cells according to claim 1 wherein an overall loading of metal particles is at least 50 wt % of the total of the loaded metal nano-particles and the electroconductive carbon carrier after loading and growing.

7. The process for producing an electrode catalyst for fuel cells according to claim 1, further comprising treating in a hydrogen-containing atmosphere at a temperature below 100° C. subsequent to loading and growing.

8. The process for producing an electrode catalyst for fuel cells according to claim 1, further comprising treating the support loaded with metal nano-particles in a hydrogen-containing atmosphere at a temperature of 20 to 80° C. subsequent to loading and growing.

9. The process for producing an electrode catalyst for fuel cells according to claim 1, wherein the same metal or another metal is grown by dispersing the carbon carrier support having the loaded metal nano-particle nuclei in a solution containing a salt of a catalytic metal to be grown, and reducing with alcohol to grow the catalytic metal on the loaded metal nano-particle nuclei.

10. The process for producing an electrode catalyst for fuel cells according to claim 9, wherein a temperature of the reduction in the solution is 50 to 120° C.

11. The process for producing an electrode catalyst for fuel cells according to claim 9, further comprising treating the support loaded with metal nano-particles in a hydrogen-containing atmosphere at a temperature below 100° C. subsequent to loading and growing.

12. The process for producing an electrode catalyst for fuel cells according to claim 9, further comprising treating the support loaded with metal nano-particles in a hydrogen-containing atmosphere at a temperature of 20 to 80° C. subsequent to loading and growing.

* * * * *